(12) United States Patent
Sekiguchi

(10) Patent No.: US 8,545,949 B2
(45) Date of Patent: *Oct. 1, 2013

(54) RESIN COMPOSITION, THERMAL TRANSFER-RECEIVING SHEET, AND METHOD FOR MAKING THERMAL TRANSFER-RECEIVING SHEET

(75) Inventor: Hideki Sekiguchi, Kanagawa (JP)

(73) Assignee: Sony Corporation, Tokyo (JP)

( * ) Notice: Subject to any disclaimer, the term of this patent is extended or adjusted under 35 U.S.C. 154(b) by 109 days.

This patent is subject to a terminal disclaimer.

(21) Appl. No.: 12/854,539

(22) Filed: Aug. 11, 2010

(65) Prior Publication Data

US 2011/0045212 A1     Feb. 24, 2011

(30) Foreign Application Priority Data

Aug. 18, 2009   (JP) .................. 2009-189587

(51) Int. Cl.
*B41M 5/40* (2006.01)
*C08G 73/02* (2006.01)
*C08F 8/00* (2006.01)

(52) U.S. Cl.
USPC .............. 428/32.5; 428/32.39; 427/385.5; 427/395; 524/507; 525/185; 525/190; 525/330.6

(58) Field of Classification Search
USPC .............. 427/385.5, 395; 428/32.5, 32.39; 524/507; 525/185, 190, 330.6
See application file for complete search history.

(56) References Cited

U.S. PATENT DOCUMENTS 5,783,517 A * 7/1998 Tomita et al. .................. 503/227

FOREIGN PATENT DOCUMENTS

| EP | 0367109 A2 | 5/1990 |
|----|------------|--------|
| EP | 0728592 A1 | 8/1996 |
| JP | 57-107885 | 7/1982 |
| JP | 60-122192 | 6/1985 |
| JP | 61-283595 | 12/1986 |
| JP | 62-189195 | 8/1987 |
| JP | 06-924152 | 2/1994 |
| JP | 10-309874 | 11/1998 |
| JP | 10-337967 | 12/1998 |
| JP | 10-337969 | 12/1998 |
| JP | 2009-067897 | * 4/2009 |

OTHER PUBLICATIONS

Sony Corporation; EP Application No. 10008301.3; European Extended Search Report, mailed Mar. 30, 2011; 7 pages.

* cited by examiner

*Primary Examiner* — Robert C Boyle
(74) *Attorney, Agent, or Firm* — Dentons US LLP

(57) ABSTRACT

A resin composition used to form a dye-receiving layer of a thermal transfer-receiving sheet in which the dye-receiving layer is formed on at least one surface of a substrate contains a core/shell-type latex including a core containing (A) and a shell containing (B) and a cross-linking agent that reacts with a carboxyl group contained in the shell. (A) is an acrylic resin at least containing, as one of its monomers, a substituted or unsubstituted phenoxyalkyl (meth)acrylate and/or a substituted or unsubstituted phenoxy polyalkylene glycol (meth)acrylate. (B) is a urethane resin containing a carboxyl group.

4 Claims, 1 Drawing Sheet

RESIN COMPOSITION, THERMAL TRANSFER-RECEIVING SHEET, AND METHOD FOR MAKING THERMAL TRANSFER-RECEIVING SHEET

BACKGROUND OF THE INVENTION

1. Field of the Invention

The present invention relates to a thermal transfer-receiving sheet used together with a thermal transfer recording ribbon having a thermal transfer dye layer. In particular, it relates to a thermal transfer-receiving sheet that has good detachability from a thermal transfer recording ribbon during printing and high color density and lightfastness. It also relates to a high-grade thermal transfer-receiving sheet that suppresses image bleeding even after being stored in a high-temperature, high-humidity environment for a long time, and to a method for making a thermal transfer-receiving sheet.

2. Description of the Related Art

Thermal transfer techniques have been available as the technique of forming color or monochrome images. The thermal transfer techniques use a thermal transfer recording ribbon, which contains a heat-diffusible dye that can be transferred by being melted or sublimated with heat from a thermal head or the like, and a thermal transfer-receiving sheet that has a dye-receiving layer for receiving the dye from the thermal transfer recording ribbon. Thermal transfer techniques are techniques for forming images by arranging a thermal transfer recording ribbon to face the dye-receiving layer of the thermal transfer-receiving sheet and pressing a thermal head against a rear side of the thermal transfer recording ribbon to apply heat so that the dye in form of an image is transferred onto the dye-receiving layer. Such thermal transfer techniques have earned a reputation as a technique for forming images from digital data and achieving gradation comparable to that of silver halide photographs without using any processing liquid such as a developing liquid.

The dye-receiving layer of the thermal transfer-receiving sheet is frequently formed by using as a main component various thermoplastic resins such as polyester, polyamide, acryl, acetate, polyvinyl chloride.vinyl acetate, styrene, polyvinyl butyral, cellulose, and polycarbonate. In particular, Japanese Unexamined Patent Application Publication No. 57-107885 proposes to provide on a substrate a dye-receiving layer that functions as a coating layer containing a saturated polyester, polyvinyl pyrrolidone, and a pigment. Japanese Unexamined Patent Application Publication No. 60-122192 proposes formation of a layer including at least one selected from a polyester resin, a polyamide resin, an acrylic resin, and an acetate resin and at least one selected from a hydrocarbon resin, a fluorine resin, and a silicon resin. Japanese Unexamined Patent Application Publication No. 61-283595 proposes formation of a layer composed of a mixture of a saturated polyester resin and a vinyl chloride-vinyl acetate copolymer. Japanese Unexamined Patent Application Publication No. 62-189195 proposes a receiving layer composed of a styrene resin.

While the object of these proposals has been to improve the color density and lightfastness, all faced a difficulty in obtaining satisfactory results. In particular, discoloration and bleeding of images caused by light, heat, and humidity have frequently occurred and high-definition recorded images could not be maintained for a long period of time. The cause therefor is the recent increase in printing speed of thermal transfer printers. In other words, when proposed thermal transfer-receiving sheets having dye-receiving layers are used in high-speed thermal transfer printers, the dye is not sufficiently dispersed and affixed in the dye-receiving layers due to short printing time. Accordingly, the dye is concentrated in the surface area of the dye-receiving layers of the thermal transfer-receiving sheets, thereby degrading the color density and lightfastness. Moreover, the dye concentrated in the surface area of the dye-receiving layer diffuses with lapse of time by being affected by temperature and humidity and thus severe image bleeding has occurred.

According to a high-speed thermal transfer printer, a thermal transfer recording ribbon and a thermal transfer-receiving sheet may be detached from each other before both are sufficiently cooled. Thus, the thermal transfer-receiving sheet preferably displays good detachability. Proposals for improving the detachability during printing include, for example, Japanese Unexamined Patent Application Publication Nos. 10-309874, 10-337967, 10-337969, and 06-24152.

Japanese Unexamined Patent Application Publication No. 10-309874 proposes a resin composition that contains polymer fine particles having a core/shell structure or a micro domain structure constituted by a polymer of a urethane resin and a polymerizable unsaturated compound, and a receiving layer composed of the resin composition. Japanese Unexamined Patent Application Publication No. 10-337967 proposes a resin composition which is a polymer having a core/shell structure in which the glass transition temperatures of the core and the shell are set within particular ranges, and a receiving layer composed of this resin composition. Japanese Unexamined Patent Application Publication No. 10-337969 proposes a resin composition containing a non-yellowing urethane resin, a resin composition having a core/shell or domain structure in which particles of a vinyl polymer are dispersed in a urethane resin, and a receiving layer a receiving layer composed of this resin composition. Japanese Unexamined Patent Application Publication No. 06-24152 proposes a composite polymeric aqueous dispersion having a core/shell structure constituted by a polymer of a polyester resin having at least one polar group and a compound having at least one polymerizable unsaturated double bond, and a receiving layer composed of this dispersion.

However, it has been difficult to achieve satisfactory detachability from the thermal transfer-receiving sheet by merely forming a core/shell structure constituted by resins having glass transition temperatures differing within a particular range as described in Japanese Unexamined Patent Application Publication No. 10-337967. Similarly, it has been difficult to achieve satisfactory detachability by a resin having a core/shell or domain structure constituted by a urethane resin that is not particularly limited and a polymerizable unsaturated compound (vinyl-containing polymer) that is not particularly limited as in Japanese Unexamined Patent Application Publication Nos. 10-309874, 10-337967, and 10-337969. In addition, these resin compositions could not offer good image storage property such as lightfastness and image bleeding resistance. The situation has been more or less the same with the dispersion having a core/shell structure constituted by a polymer of a polar group-containing polyester resin and a compound having a polymerizable unsaturated double bond as in Japanese Unexamined Patent Application Publication No. 06-24152.

SUMMARY OF THE INVENTION

Accordingly, it is desirable to provide a resin composition, a thermal transfer-receiving sheet, and a method for making a thermal transfer-receiving sheet by which high-grade images can be printed even when high-speed printing is conducted using a recent high-speed thermal transfer printer. In particular, it relates to a resin composition, a thermal transfer-receiving sheet, and a method for making a thermal transfer-receiving sheet by which the detachability from a thermal transfer recording ribbon during printing is improved, the color density and lightfastness are enhanced, and image bleeding is suppressed even after long-term storage in a high-temperature, high-humidity environment.

According to one embodiment, a resin composition used to form a dye-receiving layer of a thermal transfer-receiving sheet in which the dye-receiving layer is formed on at least one surface of a substrate includes a core/shell-type latex including a core containing (A) and a shell containing (B) and a cross-linking agent that reacts with a carboxyl group contained in the shell. (A) is an acrylic resin at least containing, as one of its monomers, a substituted or unsubstituted phenoxyalkyl(meth)acrylate and/or a substituted or unsubstituted phenoxy polyalkylene glycol (meth)acrylate and (B) is a urethane resin containing a carboxyl group.

According to another embodiment, a thermal transfer-receiving sheet includes a substrate and a dye-receiving layer formed on at least one surface of the substrate. The dye-receiving layer is formed of the aforementioned resin composition.

According to yet another embodiment, a method for making a thermal transfer-receiving sheet includes the steps of applying a resin composition on at least one surface of a substrate, the resin composition containing a core/shell-type latex including a core containing (A) and a shell containing (B), and a cross-linking agent that reacts with a carboxyl group contained in the shell; and drying the applied resin composition to form a dye-receiving layer.

The thermal transfer-receiving sheet made thereby exhibits good detachability from the thermal transfer recording ribbon even when high-speed printing is conducted and high color density and lightfastness. Moreover, image bleeding can be suppressed even when the thermal transfer-receiving sheet is stored in a high-temperature, high-humidity environment for a long time.

DESCRIPTION OF THE PREFERRED EMBODIMENTS

Figure 1:
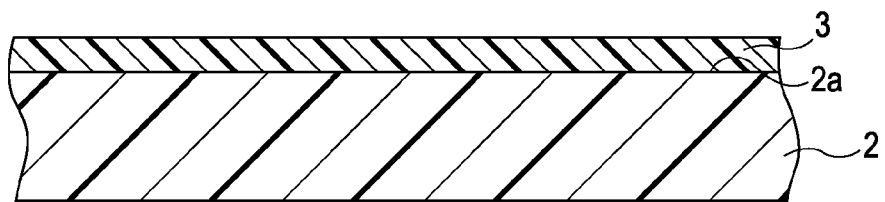
FIG. 1 is a cross-sectional view of a thermal transfer-receiving sheet.
Figure 2:
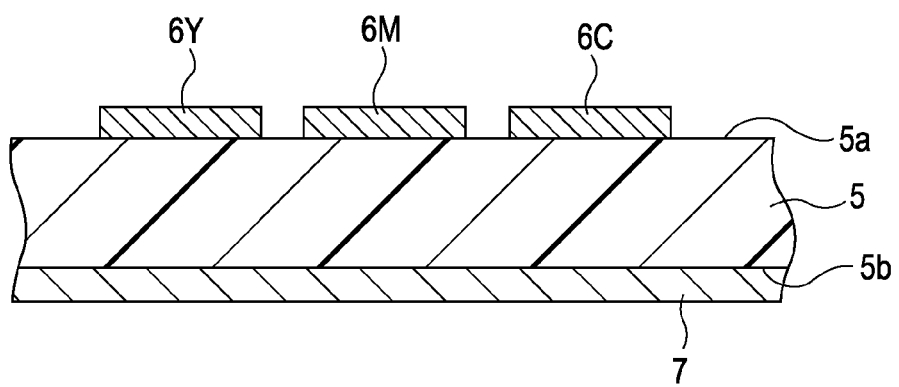
FIG. 2 is a cross-sectional view of a thermal transfer recording ribbon.

A resin composition, a thermal transfer-receiving sheet, and a method for making the thermal transfer-receiving sheet according to embodiments of the present invention will now be described in detail with reference to drawings. The description will proceed in the following order:
1. Printing method by thermal transfer technique
2. Thermal transfer-receiving sheet
  (1) Substrate
  (2) Dye-receiving layer and resin composition
3. Method for making thermal transfer-receiving sheet
4. Thermal transfer recording ribbon
1. Printing Method by Thermal Transfer Technique As shown in FIG. 1, a thermal transfer-receiving sheet 1 includes a substrate 2 and a dye-receiving layer 3 that receives a dye and is formed on a surface 2a of the substrate 2. Prior to describing the thermal transfer-receiving sheet 1, a printing method using a thermal transfer printer apparatus not shown in the drawing, the thermal transfer-receiving sheet 1, and a thermal transfer recording ribbon 4 shown in FIG. 2 is briefly described.

The thermal transfer printer apparatus is equipped with the thermal transfer recording ribbon 4 and can conduct high-speed printing on the thermal transfer-receiving sheet 1. As for this thermal transfer recording ribbon 4, for example, dye layers 6Y, 6M, and 6C composed of sublimation disperse dyes, thermally fusible dyes, or thermally dispersible dyes of three colors, for example, yellow, magenta, and cyan are sequentially arranged side-by-side on one surface 5a of a supporting body 5. A heat-resistant lubricating layer 7 for improving the transport property in the thermal transfer printer apparatus is formed on another surface 5b of the supporting body 5.

When a color image is to be formed on the thermal transfer-receiving sheet 1 by using the thermal transfer recording ribbon 4 in this thermal transfer printer apparatus, first, the thermal transfer-receiving sheet 1 is transported to a position facing the thermal transfer recording ribbon 4. Then the yellow dye layer 6Y of the thermal transfer recording ribbon and the thermal transfer-receiving sheet 1 with the dye-receiving layer 3 facing the dye layer 6Y are superimposed on each other and positioned between a thermal head and a platen. The thermal head is pressed against the platen to press the dye layer 6Y onto the thermal transfer-receiving sheet 1. The yellow dye layer 6Y is selectively heated by the thermal head on the basis of recording command information to sublimate, melt, or thermally diffuse the yellow dye and to thermally transfer the dye onto the thermal transfer-receiving sheet 1. In order to conduct high-speed printing, the thermal transfer-receiving sheet 1 preferably has a dye-receiving layer 3 into which the yellow dye can sufficiently disperse and in which the yellow dye can be fixed.

After the yellow dye has been thermally transferred, the thermal transfer recording ribbon 4 is transported so that the magenta dye layer 6M comes between the thermal head and the platen while detaching the thermal transfer recording ribbon 4 from the thermal transfer-receiving sheet 1. In a thermal transfer printer apparatus that conducts high-speed printing, the thermal transfer-receiving sheet 1 and the thermal transfer recording ribbon 4 are detached from each other before the thermal transfer-receiving sheet 1 and the thermal transfer recording ribbon 4 are sufficiently cooled. Thus, the thermal transfer-receiving sheet 1 preferably displays detachability.

Subsequently, the thermal transfer-receiving sheet 1 is returned to a position facing the magenta dye layer 6M and, as with the yellow dye, the magenta dye is thermally transferred onto the dye-receiving layer 3 of the thermal transfer-receiving sheet 1. Then, the same is conducted for the cyan dye so that the cyan dye is thermally transferred onto the thermal transfer-receiving sheet 1 to form a full color image.

2. Thermal Transfer-Receiving Sheet

As shown in FIG. 1, in the thermal transfer-receiving sheet 1, the dye-receiving layer 3 that receives a dye thermally transferred from the thermal transfer recording ribbon 4 is formed on the surface 2a of the substrate 2.

(1) Substrate

As the substrate 2, for example, various paper such as art paper, coat paper, high-grade paper, cast-coat paper, and polyolefin laminate paper, synthetic paper such as polypropylene and polyethylene terephthalate, and synthetic resin films such as polyolefin, polyvinyl chloride, polyethylene terephthalate, and polystyrene can be used. In particular, polyolefin is preferred as the substrate 2 since it can form an image closer to silver halide photographs. Furthermore, substrates such as porous synthetic resin films having fine pores formed by stretching the synthetic films to which pigments and the like are added can also be used as the substrate 2. If occasions demand, these various types of paper, synthetic paper, and synthetic resin films can be freely combined to form laminates that can be used as the substrate 2. The thickness of the substrate 2 is not singularly defined but is about 100 to 300 μm and more preferably about 150 to 250 μm.

(2) Dye-Receiving Layer

The dye-receiving layer 3 receives and retains a dye when the dye transferred from the thermal transfer recording ribbon 4 is diffused and fixed. The dye-receiving layer 3 is composed of a resin composition that contains a core/shell-type latex including a core containing (A) and a shell containing (B) below, and a cross-linking agent that reacts with carboxyl groups contained in the shell.

<Core/Shell-Type Latex>

The core/shell-type latex contains core/shell-structure particles dispersed in an aqueous medium, the particles including a core containing (A) and a shell containing (B).

(A) contained in the core is an acrylic resin that at least contains, as one of monomers, a substituted or unsubstituted phenoxyalkyl(meth)acrylate and/or a substituted or unsubstituted phenoxy polyalkylene glycol (meth)acrylate. (B) is a urethane resin containing a carboxyl group.

A monomer of the substituted or unsubstituted phenoxy-alkyl(meth)acrylate contained in the acrylic resin (A) is, for example, represented by chemical formula 1 below. In the formula, $R_1$ represents a hydrogen atom or a methyl group, $R_2$ represents a hydrogen atom, a methyl group, or an ethyl group, and m represents an integer of 1 to 3.

(Chemical formula 1)

[Chem. 1]

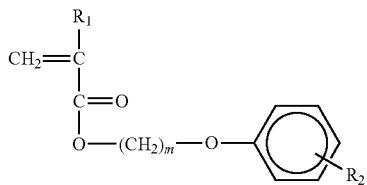

A monomer of the substituted or unsubstituted phenoxy polyalkylene glycol (meth)acrylate contained in the acrylic resin represented by (A) is, for example, represented by chemical formula 2 below. In the formula, $R_1$ represents a hydrogen atom or a methyl group, $R_2$ represents a hydrogen atom, a methyl group, or an ethyl group, and n represents an integer of 2 or 3.

(Chemical formula 2)

[Chem. 2]

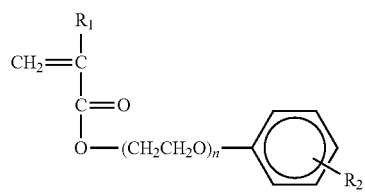

Unsubstituted phenoxyethyl acrylate or unsubstituted phenoxyethyl methacrylate are particularly preferably used as the monomer for the acrylic resin.

The acrylic resin constituting the core may be a homopolymer prepared by polymerizing one monomer selected from a substituted or unsubstituted phenoxyalkyl (meth)acrylate and a substituted or unsubstituted phenoxy polyalkylene glycol (meth)acrylate, or a copolymer prepared by copolymerizing two or more of these monomers. Moreover, the acrylic resin may be copolymerized with another (meth)acrylate as long as the advantages of the present invention are not obstructed.

Specific examples of this additional (meth)acrylate monomer include non-functional (meth)acryl monomers such as methyl methacrylate, ethyl methacrylate, propyl methacrylate, butyl methacrylate, i-butyl methacrylate, tert-butyl methacrylate, 2-ethylhexyl methacrylate, octyl methacrylate, i-decyl methacrylate, lauryl methacrylate, lauryl dodecyl methacrylate, tridecyl methacrylate, cetyl-stearyl methacrylate, stearyl methacrylate, and cyclohexyl methacrylate, and functional (meth)acryl monomers such as dimethylaminoethyl methacrylate, glycidyl methacrylate, and tetrahydrofurfuryl methacrylate.

Among these (meth)acrylate monomers, a hydroxyalkyl (meth)acrylate is particularly preferably used as a comonomer. In this case, higher color density and lightfastness can be obtained compared to when a homopolymer prepared by polymerizing one of a substituted or unsubstituted phenoxyalkyl (meth)acrylate and a substituted or unsubstituted phenoxy polyalkylene glycol (meth)acrylate, or a copolymer prepared by copolymerizing two or more of these monomers are used.

Examples of the hydroxyalkyl (meth)acrylate include hydroxymethyl methacrylate, n-hydroxyethyl methacrylate, 2-hydroxyethyl methacrylate, n-hydroxypropyl methacrylate, 2-hydroxypropyl methacrylate, n-hydroxybutyl methacrylate, 2-hydroxybutyl methacrylate, 3-hydroxy methacrylate, n-hydroxypentyl methacrylate, 2-hydroxypentyl methacrylate, 3-hydroxypentyl methacrylate, 4-hydroxypentyl methacrylate, n-hydroxyhexyl methacrylate, 2-hydroxyhexyl methacrylate, 3-hydroxyhexyl methacrylate, 4-hydroxyhexyl methacrylate, 5-hydroxyhexyl methacrylate, hydroxymethyl acrylate, n-hydroxyethyl acrylate, 2-hydroxyethyl acrylate, n-hydroxypropyl acrylate, 2-hydroxypropyl acrylate, n-hydroxybutyl acrylate, 2-hydroxybutyl acrylate, 3-hydroxy acrylate, n-hydroxypentyl acrylate, 2-hydroxypentyl acrylate, 3-hydroxypentyl acrylate, 4-hydroxypentyl acrylate, n-hydroxyhexyl acrylate, 2-hydroxyhexyl acrylate, 3-hydroxyhexyl acrylate, 4-hydroxyhexyl acrylate, and 5-hydroxyhexyl acrylate. Among these, a hydroxyalkyl (meth)acrylate having an alkyl group including 1 to 3 carbon atoms is preferred.

When the hydroxy (meth)acrylate or the (meth)acrylate monomer is copolymerized, the composition ratio of the substituted or unsubstituted phenoxyalkyl (meth)acrylate and/or substituted or unsubstituted phenoxy polyalkylene glycol (meth)acrylate preferably accounts for 50 to 100 mass %, preferably 50 to 95 mass %, and more preferably 60 to 90 mass % of the entire core.

The urethane resin (B) contained in the shell contains carboxyl groups as one component. Particles having the core/shell structure display good water dispersion stability in aqueous media due to inclusion of hydrophilic carboxyl groups in the shell.

The urethane resin can be made by any urethane production method using carboxyl-containing polyols and the like. Any carboxy-containing polyols can be used as the carboxyl-containing polyols. A carboxyl-containing polyol preferably contains one carboxyl group in a molecule and dimethylol propionic acid (DMPA) and dimethylol butanoic acid (DMBA) are particularly preferred. The composition ratio of the carboxyl-containing polyol in the urethane resin is preferably 2 to 15 mass % and more preferably 5 to 10 mass %.

The carboxyl-containing polyol is used mainly to improve water dispersion stability of the core/shell type latex. When the composition ratio of the carboxyl-containing polyol in the urethane resin is 2 mass % or more, the water dispersion stability improves. When the composition ratio is 15 mass % or less, image bleeding after long-term storage can be prevented. Thus, when the composition ratio of the carboxyl-containing polyol is within the range of 2 to 15 mass %, both water dispersion stability and the image bleeding resistance can be achieved.

Examples of the isocyanate compound used in making the carboxyl-containing urethane resin include aliphatic diisocyanates such as ethylene diisocyanate, hexamethylene diisocyanate (HMDI), tetramethylene diisocyanate, alicyclic diisocyanate such as isophorone diisocyanate (IPDI) and dicyclohexylmethane-4,4'-diisocyalate (H12MDI), and araliphatic diisocyanates such as xylylene diisocyanate (XDI) and tetramethylxylylene diisocyanate (TMXDI). Any isocyanate compound can be used as the isocyanate. In particular, hexamethylene diisocyanate (HMDI), isophorone diisocyanate (IPDI), dicyclohexylmethane-4,4'-diisocyanate (H12MDI), xylylene diisocyanate (XDI), and tetramethylxylylene diisocyanate (TMXDI) are non-yellowing and thus more preferable.

The carboxyl-containing urethane resin (B) may contain any polyol compound as another constituent component in addition to the carboxyl-containing polyol and the isocyanate. In particular, an aliphatic polyester polyol or an aliphatic polycarbonate polyol is preferably used to improve the detachability of the thermal transfer-receiving sheet 1.

An aliphatic polyester polyol can be obtained by dehydration synthesis between an aliphatic polyalcohol component and an aliphatic polycarboxylic acid component. Examples of the aliphatic polyalcohol component include ethylene glycol, 1,3-propanediol, 1,4-butanediol, 1,5-pentanediol, 1,6-hexanediol, 1,7-heptanediol, 1,8-octanediol, 1,9-nonanediol, 1,10-decanediol, 1,11-undecanediol, 1,12-dodecanediol, 2-methyl-1,8-octanediol, neopentyl glycol, 2-ethyl-1,6-hexanediol, 2-methyl-1,3-propanediol, 3-methyl-1,5-pentanediol, 2,4-dimethyl-1,5-pentanediol, 2,4-diethyl-1,5-pentanediol, 1,3-cyclohexanediol, 1,4-cyclohexanediol, 1,4-cyclohexanedimethanol, and 2-bis(4-hydroxycyclohexyl)-propane. Examples of the aliphatic polycarboxylic acid component include oxalic acid, malonic acid, succinic acid, glutaric acid, adipic acid, pimelic acid, suberic acid, azelaic acid, sebacic acid, maleic acid, and fumaric acid. Any suitable aliphatic polyester polyol can be used as the aliphatic polyester polyol.

Among the aliphatic polyester polyols, those that use a diol of a C4-C6 linear alkyl having hydroxyl groups at both ends is particularly preferred as the aliphatic polyalcohol component and a C4-C6 linear alkyl having carboxylic acid groups at both ends as the aliphatic polycarboxylic acid component are preferred. In particular, 1,5-pentanediol or 1,6-hexanediol is preferably used as the aliphatic polyalcohol component of the aliphatic polyester polyol. Succinic acid, glutaric acid, or adipic acid, i.e., a linear dicarboxylic acid having 4 to 6 carbon atoms, is more preferred as the aliphatic polycarboxylic acid component.

Any aliphatic polycarbonate polyol obtained by condensation reaction between a carbonate component and an aliphatic polyalcohol component can be used as the aliphatic polycarbonate polyol. Examples of the carbonate component include alkylene carbonates such as ethylene carbonate, trimethylene carbonate, 1,2-propylene carbonate, 1,2-butylene carbonate, 1,3-butylene carbonate, and 1,2-pentylene carbonate, dialkyl carbonates such as dimethyl carbonate, diethyl carbonate, dipropyl carbonate, and dibutyl carbonate, and diaryl carbonates such as diphenyl carbonate. Examples of the aliphatic polyalcohol component include ethylene glycol, 1,3-propanediol, 1,4-butanediol, 1,5-pentanediol, 1,6-hexanediol, 1,7-heptanediol, 1,8-octanediol, 1,9-nonanediol, 1,10-decanediol, 1,11-undecanediol, 1,12-dodecanediol, 2-methyl-1,8-octanediol, neopentyl glycol, 2-ethyl-1,6-hexanediol, 2-methyl-1,3-propanediol, 3-methyl-1,5-pentanediol, 2,4-dimethyl-1,5-pentanediol, 2,4-diethyl-1,5-pentanediol, 1,3-cyclohexanediol, 1,4-cyclohexanediol, 1,4-cyclohexanedimethanol, and 2-bis(4-hydroxycyclohexyl)-propane.

Among these aliphatic polycarbonate polyols, aliphatic polycarbonate polyols mainly composed of linear alkylene diols having 4 to 6 carbon atoms, such as a polycarbonate polyol of 1,6-hexanediol, a polycarbonate polyol of 1,6-hexanediol and 1,4-butanediol, a polycarbonate polyol of 1,6-hexanediol and 1,5-pentanediol, a polycarbonate polyol of 1,6-hexanediol and 3-methyl-1,5-pentanediol are more preferably used.

When the aliphatic polyester polyol or the aliphatic polycarbonate polyol is used in the urethane resin, higher color density and lightfastness can be obtained. When the urethane resin is composed of an aliphatic polyester polyol and/or an aliphatic polycarbonate diol, a carboxyl-containing aliphatic polyol, and an isocyanate compound, detachment and lightfastness during printing are improved.

A common chain elongation agent, such as ethylene glycol, diethylene glycol, propylene glycol, dipropylene glycol, 1,4-butanediol, 1,3-butanediol, 1,5-pentanediol, 3-methyl-1,5-pentanediol, neopentyl glycol, 1,6-hexane diol, or trimethylolpropane may be used in the urethane resin (B).

The average molecular weight of the acrylic resin is 50,000 to 200,000 and more preferably 70,000 to 150,000. The average molecular weight of the urethane resin is 5,000 to 100,000 and more preferably 20,000 to 70,000. When the average molecular weights of the acrylic resin and the urethane resins are respectively 50,000 or more and 5,000 or more, the dye-receiving layer 3 does not degrade in terms of strength, is resistant to scratches, and can avoid a problem of blocking that occurs between the rear side of the thermal transfer-receiving sheet 1 and the dye-receiving layer 3 when the thermal transfer-receiving sheets 1 are stacked for storage.

The core/shell ratio (mass ratio) of the core containing the acrylic resin (A) to the shell containing the urethane resin (B) is 8/2 to 4/6 and more preferably 7/3 to 5/5. It is not preferable for the core/shell ratio to exceed 8/2 and be 9/1, for example, since the color density and the lightfastness may degrade due to an excessively high acrylic resin (core) ratio. In contrast, it is not preferable for the core/shell ratio to exceed 4/6 and be 3/7, for example, since the detachability during printing and the image bleeding resistance after long-term storage may be degraded due to an excessively low acrylic resin (core) ratio.

Here, the acrylic resin contained in the core preferably has a glass transition temperature higher than that of the urethane resin contained in the shell. For example, it is preferable to use an acrylic resin having a glass transition temperature of about 50° C. and a urethane resin having a glass transition temperature of about 40° C. When the core/shell ratio exceeds 4/6 and is 3/7, for example, detachability during printing may be degraded due to inclusion of a large amount of the urethane resin having a low glass transition temperature.

As for the method for preparing a core/shell-type latex, for example, a method of emulsion-polymerizing the constituent elements of the acrylic resin, such as monomers and oligomers, in the presence of a latex containing resin particles composed of a urethane resin can be employed. For example, a method of emulsion-polymerizing a mixed solution of monomers and oligomers constituting the urethane resin and the acrylic resin can be employed. Furthermore, a method of emulsion-polymerizing a mixed solution of a urethane resin and monomers and oligomers constituting an acrylic resin in the presence of resin particles composed of a urethane resin can be used, for example. Note that monomers and oligomers constituting the acrylic resin or a mixed solution of these and the urethane resin may be emulsified in advance and used.

Furthermore, a method for conducting polymerization by adding a mixed solution or monomers and oligomers constituting the acrylic resin in one batch or a method for conducting polymerization by adding part of the materials to conduct polymerization and then adding the rest to further conduct polymerization can be employed. The method for preparing a core/shell-type latex is not limited to those described above and any suitable synthetic method can be employed.

In the emulsion polymerization described above, any emulsifier can be used but the image bleeding may be worsened after long-term storage depending on the type and amount of the emulsifier. Thus, a range that can avoid such problems is preferred. Examples of the emulsifier include nonionic surfactants such as polyoxyethylene lauryl ether, polyoxyethylene oleylphenyl ether, polyoxyethylene nonylphenyl ether, and oxyethylene.oxypropylene block copolymers, anionic surfactants such as sodium dodecylbenzene sulfonate, sodium alkyl diphenyl ether disulfonate, sodium alkyl naphthalene sulfonate, sodium lauryl sulfate, sodium polyoxyethylene alkyl ether sulfate, sodium polyoxyethylene alkyl phenyl ether sulfate, and sodium dialkyl sulfosuccinate, and protective colloids such as polyvinyl alcohols and various water-soluble polymers.

In the emulsion polymerization, various polymerization initiators such as persulfates, e.g., potassium persulfate, sodium persulfate, and ammonium persulfate, and hydrogen peroxide can be used. In the emulsion polymerization, various chain transfer agents such as alcohols, e.g., catechol, thiols, and mercaptans can be used to adjust the molecular weights of the acrylic resin and the urethane resin. The polymerization temperature can be appropriately adjusted within the range of 30° C. to 100° C. in accordance with the type of the polymerization initiator. The pH of the core/shell-type latex can be adjusted. The pH is preferably in a neutral to weakly alkaline region, i.e., 5 to 10 and more preferably 6 to 9.

The average particle diameter of the core/shell-type latex of the acrylic resin and the urethane resin is 0.001 to 5 μm and preferably about 0.01 to 2 μm, and can be appropriately adjusted within the range that does not impair the water dispersion stability, the film forming property, and the adhesive property.

Any cross-linking agent can be suitably used as the cross-linking agent to be contained in the resin composition as long as the cross-linking agent has a reactivity to carboxyl groups contained in the urethane resin contained in the shell. The cross-linking agent can suppress the dye-receiving layer 3 from absorbing moisture when reacted with the carboxyl groups in the urethane resin.

Examples of the cross-linking agent include isocyanate compounds such as water-dispersible polyisocyanates and block-type polyisocyanates, polyepoxy compounds such as glycerol polyglycidyl ether, trimethylol propane polyglycidyl ether, diglycol polyglycidyl ether, polyglycol polyglycidyl ether, sorbitol polyglycidyl ether, ethylene glycol polyglycidyl ether, polyethylene glycol polyglycidyl ether, propylene glycol polyglycidyl ether, polypropylene glycol polyglycidyl ether, and polyamine compounds such as polyallylamine.

The cross-linking agent is added to the resin composition along with the core/shell-type latex the main solvent of which is water and the resin composition is applied on the substrate 2 by using various coaters described below so as to finally form a high-grade dye-receiving layer 3. In order to do so, the following cross-linking agents are particularly preferred. As the cross-linking agent, a compound having an aziridine group such as 2,2'-bishydroxymethylbutanol-tris(3-(1-aziridinyl)propanate) and 4,4'-bis(ethyleneiminocarbonylamino)diphenylmethane, is particularly preferred. It is particularly preferable to use a compound containing an oxazoline group or a carbodiimide group as the cross-linking agent. In this manner, the resin composition exhibits good pot life and cross-linking property with carboxyl groups and a dye-receiving layer 3 that can suppress image bleeding after long-term storage and provide high-grade images can be obtained.

The amount of the cross-linking agent added to the resin composition is 5 to 300 mol % and more preferably 10 to 200 mol % on the basis of the amount of the cross-linking groups of the cross-linking agent with respect to the amount of the carboxyl groups of the urethane resin constituting the shell of the core/shell-type latex. The amount of the cross-linking agent added is preferably 5 mol % or more to achieve sufficient crosslinking and prevent a decrease in film strength of the dye-receiving layer 3, degradation of the adhesion of the film, and deterioration of the scratch resistance, water resistance, and the like, as well as occurrence of image bleeding after long-term storage. The amount of the cross-linking agent added is preferably 300 mol % or less so that the amount of the cross-linking agent that remains unreacted to carboxyl groups is not large and deterioration of the lightfastness and bleeding of images after long-term storage can be prevented. When the cross-linking agent is contained in the dye-receiving layer 3, softening is suppressed and the detachability is improved.

The solvent for the core/shell-type latex is mainly water but other organic solvents may be added within the range that does not obstruct the advantages of the present invention. Examples of the organic solvents include alcohols such as methanol, ethanol, n-propanol, and i-propanol, glycols such as ethylene glycol and propylene glycol, glycol derivatives such as methyl cellosolve and ethyl cellosolve, ethers such as tetrahydrofuran and dioxane, ketones such as methyl ethyl ketone and cyclohexane, and esters such as ethyl acetate.

Various additives may be added to the resin composition and the dye-receiving layer 3 as long as the advantages of the present invention are not obstructed. Examples of the additives include a detaching agent, a lubricant, a plasticizer, a pigment, a humectant, a defoaming agent, a dispersant, an antistatic agent, a fluorescent whitening agent, an UV absorber, a photostability agent, and a cross-linking agent.

A cushion layer or the like in which vinyl- or vinylidene-based hollow resin fine particles or micro balloons composed of glass are added to a binder resin may be formed on the substrate 2 of the thermal transfer-receiving sheet 1, if occasions demand. When a cushion layer is provided, the cushion layer suppresses generation of uncopied spots and density nonuniformity during printing and transferred images with higher reproducibility can be obtained. The density of such a cushion layer is not singularly defined but is about 0.3 to 0.8 cc/g. The amount of application on a dry solid basis is about 1 to 50 g/m². In general, when a cushion layer is provided, since the cushion layer is porous, penetration may occur when the dye-receiving layer 3 is formed by application. Any barrier layer may be interposed between the cushion layer and the dye-receiving layer 3 of the thermal transfer-receiving sheet 1 to avoid this problem.

The barrier layer is composed of various organic or inorganic fine particles, an antistatic agent, a lubricant, a preservative, a humectant, a defoaming agent, a dispersant, a fluorescent whitening agent, a cross-linking agent, a binder resin, and the like, and the amount of application is about 0.1 to 5 $g/m^2$ on a dry solid basis.

The thermal transfer-receiving sheet 1 may be provided with any back coat layer on the side opposite the dye-receiving layer 3 so as to improve the transport property of the thermal transfer printer, impart writability, and increase the opacity. The back coat layer is composed of various organic or inorganic fine particles, an antistatic agent, a lubricant, a preservative, a humectant, a defoaming agent, a dispersant, a fluorescent whitening agent, a cross-linking agent, a binder resin, and the like, and the amount of application is about 0.1 to 5 $g/m^2$ on a dry solid basis.

3. Method for Making Thermal Transfer-Receiving Sheet

The thermal transfer-receiving sheet 1 having the aforementioned structure can be made by applying the resin composition at least on the surface 2a of the substrate 2 by the method below and drying the applied resin composition at a particular temperature for a particular time to form the dye-receiving layer 3.

Examples of the method of applying the resin composition on the substrate 2 include methods that use a curtain coater, a die coater, an air knife coater, a blade coater, a gate roll coater, a bar coater, a rod coater, a roll coater, a gravure coater, and the like. Any technique may be used in the application method. When a cushion layer or a barrier layer is to be provided, a material that will form a cushion layer, a material that will form a barrier layer, and a resin composition that will form the dye-receiving layer 3 are sequentially applied with a die coater or the like to form a multilayer fluid body and the multilayer fluid body may be applied on the substrate 2 in one step. This method is a preferred method for forming the thermal transfer-receiving sheet 1 due to high economical efficiency. In the method for making the thermal transfer-receiving sheet 1, an adhesiveness-enhancing treatment such as a corona discharge treatment or a plasma treatment may be performed on the substrate 2 if occasions demand, to improve the adhesion between the substrate 2 and the dye-receiving layer 3.

The amount of the resin composition applied for forming the dye-receiving layer 3 is preferably in the range of 0.5 to 30 $g/m^2$ and more preferably 1 to 5 $g/m^2$ on a dry solid basis. Although not singularly defined, an applied amount of 0.5 $g/m^2$ or more is sufficient for receiving the dye, thereby achieving high color density and suppressing degradation of lightfastness and image bleeding resistance. On the other hand, at 30 $g/m^2$ or less, problems such as a decrease in color density can be prevented and economical efficiency can be achieved. Accordingly, when the amount of the resin composition applied is 0.5 to 30 $g/m^2$ on a dry solid basis, economical efficiency can be achieved, the color density and lightfastness can be improved, and image bleeding can be prevented.

In the method for making the thermal transfer-receiving sheet 1, a water-based coat layer is formed on a surface of the substrate 2 constituted by various film, synthetic paper, synthetic resin film, or the like. The resin composition for forming the dye-receiving layer 3 is sometimes applied on the coat layer without providing a cushion layer or the like. In this case, in the method for making the thermal transfer-receiving sheet 1, it is more economical to use the resin composition of this embodiment containing water as a medium than to use a common resin composition containing an organic solvent such as toluene as the medium. Moreover, the production process can be simplified.

As described above, in the thermal transfer-receiving sheet 1, the dye-receiving layer 3 on the substrate 2 is composed of a resin composition that contains a core/shell-type latex including a core containing an acrylic resin (A) and a shell containing (B), and a cross-linking agent that reacts with carboxyl groups contained in the shell. As a result, since the dye-receiving layer 3 of the thermal transfer-receiving sheet 1 contains the particular core/shell-type latex and the cross-linking agent, the detachability from the thermal transfer recording ribbon 4 can be improved, the color density and lightfastness can be increased, and the image bleeding can be suppressed after long-term storage in a high-temperature, high-humidity environment even when high-speed printing is performed.

4. Thermal Transfer Recording Ribbon

Any thermal transfer recording ribbon can be used as the thermal transfer recording ribbon 4 from which a dye is transferred onto the thermal transfer-receiving sheet 1. In particular, in the thermal transfer recording ribbon 4, as shown in FIG. 2, yellow, magenta, and cyan dye layers 6Y, 6M, and 6C (also simply referred to as "dye layer 6") are formed side-by-side on the supporting body 5. During printing, dyes contained in the dye layer 6 of the thermal transfer recording ribbon 4 are thermally transferred onto the dye-receiving layer 3 of the thermal transfer-receiving sheet 1.

Examples of the supporting body 5 on which the dye layer 6 of the thermal transfer recording ribbon 4 is applied include plastic films such as polyester films, polystyrene films, polypropylene films, polysulfone films, polycarbonate films, polyimide films, and aramid films, paper, and synthetic paper. The thickness of the supporting body 5 is usually about 1 to 30 μm.

Examples of the yellow dye include azo dyes, disazo dyes, methine dyes, styryl dyes, pyridone.azo dyes, and mixtures of these. Examples of the magenta dye include azo dyes, anthraquinone dyes, styryl dyes, heterocyclic azo colorants, and mixtures of these. Examples of the cyan dye include anthraquinone dyes, naphthoquinone dyes, heterocyclic azo colorants, indoaniline dyes, and mixtures of these.

The dye layer 6 contains a binder resin for retaining the respective dyes and for forming the dye layer 6. Examples of the binder resin include cellulose resins such as methyl cellulose, ethyl cellulose, hydroxyethyl cellulose, hydroxypropyl cellulose, and cellulose acetate, vinyl resins such as polyvinyl alcohol, polyvinyl butyral, polyvinyl acetoacetal, polyvinyl acetate, and polystyrene, and urethane resins.

Regarding the structure of the thermal transfer recording ribbon 4, as shown in FIG. 2, the yellow dye layer 6Y, the magenta dye layer 6M, the cyan dye layer 6C, and, in some cases, a black dye layer not shown in the drawing are provided next to each other continuously on the surface 5a of the supporting body 5. A sensor mark for allowing a thermal transfer printer apparatus to detect the position of the thermal transfer recording ribbon 4 may be provided to the thermal transfer recording ribbon 4. A transparent transfer protection layer for protecting an image formed by transferring the dyes onto the dye-receiving layer 3 may be provided to the thermal transfer recording ribbon 4. A heat-resistant lubricating layer 7 for improving the transport property of the thermal transfer recording ribbon 4 in the thermal transfer printer apparatus and to prevent burn-in with the thermal head can also be provided on the surface 5b of the supporting body 5 opposite the dye layer 6.

When printing is conducted with a thermal transfer printer apparatus by using the thermal transfer-receiving sheet 1 and the thermal transfer recording ribbon 4, the yellow dye layer 6Y is positioned to face the dye-receiving layer 3 and the yellow dye layer 6Y is heated to thermally transfer the yellow dye onto the dye-receiving layer 3. Since the dye-receiving layer 3 of the thermal transfer-receiving sheet 1 is composed of a resin composition that contains a core/shell-type latex and a cross-linking agent that reacts with carboxyl groups contained in the shell, the yellow dye sufficiently disperses and stay fixed in the dye-receiving layer 3. Then the thermal transfer recording ribbon 4 is transported to allow the magenta dye layer 6M to face the thermal head and the platen in order to transfer the magenta dye onto the thermal transfer-receiving sheet 1 while the thermal transfer recording ribbon 4 is being detached from the thermal transfer-receiving sheet 1. Since the dye-receiving layer 3 of the thermal transfer-receiving sheet 1 is composed of the aforementioned resin composition, the detachability is high and the thermal transfer recording ribbon can be detached without any problems. After the magenta dye has been transferred, the cyan dye can be similarly transferred onto the thermal transfer-receiving sheet 1 to form an image or the like. Similarly, the magenta and cyan dyes can sufficiently disperse and stay fixed in the dye-receiving layer 3 and the detachability from the thermal transfer recording ribbon 4 is high.

In sum, according to the thermal transfer-receiving sheet 1, since the dye-receiving layer 3 is composed of a resin composition that contains a core/shell-type latex and a cross-linking agent that reacts with carboxyl groups contained in the shell, the respective color dyes transferred thereto sufficiently disperse and stay fixed. Thus, an image with high color density and lightfastness can be obtained on the thermal transfer-receiving sheet 1.

Moreover, according to the thermal transfer-receiving sheet 1, image bleeding can be suppressed even when stored in a high-temperature, high-humidity environment for a long time since the dye-receiving layer 3 is composed of the resin composition. The thermal transfer-receiving sheet 1 also exhibits good detachability and prevents occurrence of problems in detaching from the thermal transfer recording ribbon 4.

Accordingly, the thermal transfer-receiving sheet 1 exhibits good detachability from the thermal transfer recording ribbon 4 not only when printing is conducted at a regular speed but also at a high speed. The thermal transfer-receiving sheet 1 has high color density and lightfastness and image bleeding can be suppressed even after long-term storage in a high-temperature, high-humidity environment, and high-grade images and the like can be formed.

EXAMPLES

Specific examples of the present invention are described in detail below on the basis of experimental results. Although the present invention is described in detail below by using examples, the content of the present invention is not limited by these. In the examples, "parts" and "%" respectively indicate parts by mass and percent by mass.

First, preparation of the core/shell-type latex and adjustment of the resin composition are described. Twenty-two types of core/shell-type latexes (A to V) were prepared with compounds and compositions indicated in Tables 1 and 2 below. The properties of each latex are also indicated in Tables 1 and 2. The viscosity and pH of the latexes were measured in a 25° C. environment.

For example, a resin composition A can be prepared as follows. Into a reactor equipped with a reflux condenser, 35 parts of elitel 3320 (UE3320 in Table 1) (produced by Unitika Ltd.), 25 parts of PLACCEL 220A (220AL in Table 1) (produced by Daicel Chemical Industries, Ltd.), 10 parts of 2,2-dimethylolpropionic acid (DMPA in Table 1), and 20 parts of methyl ethyl ketone were placed and stirred at 90° C. until the mixture became homogeneous.

Next, after confirming the reflux of the solvent, 30 parts of isophorone diisocyanate (IPDI in Table 1) was added to conduct polymerization, thereby synthesizing a urethane prepolymer. Under a 25° C. condition, 2.75 parts of ethylenediamine and 170 parts of ion exchange water were stirred using a homogenizer and to the resulting mixture the urethane prepolymer was added. The stirring was continued until the chain extension was finished. The resulting product was stirred under a reduced pressure condition at 40° C. to remove the solvent and water, thereby obtaining a urethane dispersion (35% solid). Into a reactor equipped with a reflux condenser, 290 g of this urethane dispersion and 60 g of ion exchange water were added and the resulting mixture was stirred and heated to 75° C. To the resulting mixture, 100 parts of PEMA (phenyl ethyl methacrylate) and 100 g of ion exchange water and a potassium persulfate catalytic aqueous solution were added dropwise over 2 hours, followed by 1 hour of stirring to prepare a latex to be used in a resin composition A. Latexes to be used in resin compositions B to V can be prepared in a similar manner.

TABLE 1

| | | | Resin Composition | | | | | | | | | | | | | | | | |
|---|---|---|---|---|---|---|---|---|---|---|---|---|---|---|---|---|---|---|---|
| | | | A | B | C | D | E | F | G | H | I | J | K | L | M | N | O | P | Q |
| Latex | Core | PEMA | 100 | | 62 | 100 | 100 | 100 | 100 | 100 | 100 | 100 | 80 | 80 | 80 | 80 | 80 | 80 | 80 |
| | | PEO2MA | | 100 | | | | | | | | | | | | | | | |
| | | 2HEMA | | | | | | | | | | | 20 | 20 | 20 | 20 | 20 | 20 | 20 |
| | | 2EHA | | | 38 | | | | | | | | | | | | | | |
| | | St | | | | | | | | | | | | | | | | | |
| | | Bz | | | | | | | | | | | | | | | | | |
| | Shell | St | | | | | | | | | | | | | | | | | |
| | | 2EHA | | | | | | | | | | | | | | | | | |
| | | AA | | | | | | | | | | | | | | | | | |
| | | PTMG2000 | | | 60 | | | | | | | | 60 | | | | | | |
| | | NS2400 | | | | | | | 53 | 55 | | | | | 60 | | 55 | | |
| | | P1010 | | | | | | | | | | | | | | 47 | | | |
| | | T5652 | | | | | | | | | 67 | 55 | | | | | | 60 | 55 |
| | | UE3320 | 35 | 35 | | 35 | 35 | 35 | | | | | 35 | | | | | | |
| | | 220AL | 25 | 25 | | 25 | 25 | 25 | | | | | 25 | | | | | | |

TABLE 1-continued

| | | Resin Composition | | | | | | | | | | | | | | | | |
|---|---|---|---|---|---|---|---|---|---|---|---|---|---|---|---|---|---|---|
| | | A | B | C | D | E | F | G | H | I | J | K | L | M | N | O | P | Q |
| | NPG | | | | | | | 5 | 5 | | 5 | | | | 2 | 5 | | 5 |
| | DMPA | 10 | 10 | 10 | 10 | 10 | 10 | 5 | 5 | 5 | 5 | 10 | 10 | 10 | 10 | 5 | 10 | 5 |
| | IPDI | 30 | 30 | 30 | 30 | 30 | 30 | | 35 | | 35 | 30 | 30 | 30 | 41 | 35 | 30 | 35 |
| | H12MDI | | | | | | | 37 | | 28 | | | | | | | | | |
| | Core/shell ratio | 5/5 | 5/5 | 5/5 | 5/5 | 5/5 | 5/5 | 4/6 | 4/6 | 4/6 | 4/6 | 7/3 | 5/5 | 5/5 | 5/5 | 5/5 | 5/5 | 5/5 |
| Mw (×10$^4$) | Core | 15 | 15 | 15 | 15 | 15 | 15 | 10 | 10 | 10 | 10 | 10 | 15 | 15 | 15 | 10 | 15 | 10 |
| | Shell | 1.4 | 1.4 | 1.4 | 1.4 | 1.4 | 1.4 | 2 | 2 | 2 | 2 | 2 | 1.4 | 1.4 | 1.4 | 2 | 1.4 | 2 |
| | Solid content (%) | 36.6 | 38.9 | 36.8 | 36.6 | 36.6 | 36.6 | 41.8 | 38.9 | 39.3 | 39.2 | 48.8 | 39.6 | 40.2 | 35.5 | 48.8 | 40.2 | 48.8 |
| | Viscosity (mPa·s) | 22 | 33 | 13 | 22 | 22 | 22 | 22.5 | 28 | 17.5 | 56 | 38 | 35 | 16 | 15 | 31 | 16 | 31 |
| | pH | 7.2 | 6.9 | 7.2 | 7.2 | 7.2 | 7.2 | 7.4 | 7.7 | 7.4 | 7.7 | 6.2 | 8.1 | 7.5 | 6.6 | 7.4 | 7.5 | 7.4 |
| Cross-linking agent | WB40-100 | * | * | * | | | | * | | * | | * | | * | | * | | |
| | DZ22E | | | | * | | | | | | | | | | | | | |
| | K2040E | | | | | * | | | * | | * | | * | | * | | * | * | * |
| | E01 | | | | | | * | | | | | | | | | | | | |

TABLE 2

| | | Resin Composition | | | | |
|---|---|---|---|---|---|---|
| | | R | S | T | U | V |
| Latex Core | PEMA | 80 | | | 100 | |
| | PEO2MA | | | | | |
| | 2HEMA | 20 | | | | |
| | 2EHA | | | 30 | 25 | 15 |
| | St | | | 70 | 75 | |
| | Bz | | | | | 85 |
| Shell | St | | 62 | | | |
| | 2EHA | | 10 | | | |
| | AA | | 28 | | | |
| | PTMG2000 | | | | | |
| | NS2400 | | | | | |
| | P1010 | | | 47 | 47 | 47 |
| | T5652 | | | | | |
| | UE3320 | | | | 35 | |
| | 220AL | | | | 25 | |
| | NPG | | | 2 | 2 | 2 |
| | DMPA | | | 10 | 10 | 10 |
| | IPDI | | | 41 | 30 | 41 |
| | H12MDI | | | | | |
| | Core/shell ratio | 7/3 | 5/5 | 5/5 | 5/5 | 5/5 |
| Mw (×10$^4$) | Core | 10 | 15 | 15 | 15 | 15 |
| | Shell | 0.8 | 1.4 | 1.4 | 1.4 | 1.4 |
| | Solid content (%) | 42.5 | 35.8 | 36.8 | 36.6 | 35.7 |
| | Viscosity (mPa·s) | 40 | 22 | 17 | 22 | 17 |
| | pH | 6.9 | 6.7 | 7.1 | 7.2 | 6.7 |
| Cross-linking agent | WB40-100 | * | * | * | | |
| | DZ22E | | | | | |
| | K2040E | | | | | |
| | E01 | | | | | |

Acronyms in Tables 1 and 2 are as follows: PEMA stands for phenyl ethyl methacrylate, equivalent to Chemical Formula 1; PEO2MA stands for phenyl ethylene oxide (2 mol)-modified methacrylate, equivalent to Chemical Formula 2; 2HEMA stands for 2-hydroxyethyl methacrylate; 2EHA stands for 2-ethylhexyl acrylate; St stands for styrene; CHMA stands for cyclohexyl methacrylate; BZ stands for benzyl methacrylate; MMA stands for methyl methacrylate; AA stands for acrylic acid; NPG stands for neopentyl glycol; DMPA stands for dimethylolpropionic acid, i.e., carboxyl-containing aliphatic polyol; IPDI stands for isophorone diisocyanate; H12MDI stands for 4,4'-methylenebiscyclohexyl diisocyanate; PTMG2000 stands for polytetramethylene glycol (Mw 2000) produced by Mitsubishi Chemical Corporation; NS2400 stands for 1,5-pentanediol+adipic acid polyester (Mw 2000) produced by Adeka Corporation, i.e., aliphatic polyester polyol; P1010 stands for 1,5-pentanediol+adipic acid polyester (Mw 1000), i.e., Kuraray polyol produced by Kuraray Co., Ltd., or aliphatic polyester polyol; T5652 stands for 1,6-hexanediol-based polycarbonate (Mw 1000), i.e., Duranol produced by Adeka Corporation or aliphatic polycarbonate polyol; UE3320 stands for phthalic acid-based polyester diol (Mw 2000), i.e., elitel produced by Unitika Ltd.; 220AL stands for caprolactone diol (Mw 1800) PLACCEL produced by Daicel Chemical Industries, Ltd.; WB40-100 stands for water-dispersible polyisocyanate, Duranate produced by Adeka Corporation; DZ22E stands for aziridine-containing compound, CHEMITITE produced by NIPPON SHOKUBAI CO., LTD.; K2030E stands for oxazoline-containing polymer, EPOCROS produced by NIPPON SHOKUBAI CO., LTD.; and E01 stands for carbodiimide-containing polymer, CARBODILITE produced by Nisshinbo Chemical Inc.

Next, various cross-linking agents indicated in Tables 1 and 2 were added to the latexes so that the amounts of the cross-linking agents are molar equivalents relative to carboxyl groups of the DMPA (dimethylolpropionic acid), 0.5 parts of X22-4272 (modified silicone oil produced by Shin-Etsu Silicones) was added thereto as a detaching agent, and pure water was added to prepare resin compositions A to V having a solid content of 12%. Asterisks in the rows associated with the cross-linking agents in Tables 1 and 2 indicate that the marked types of the cross-linking agents were used.

Each of the resin compositions A to V prepared as above and indicated in Tables 1 and 2 was applied on a substrate with a Mayer bar so that the applied amount after drying was 2.5 g/m$^2$, and dried at 100° C. for 1 minute to form a dye-receiving layer. As a result, thermal transfer recording paper of Examples 1 to 17 and Comparative Examples 1 to 5 were obtained. A substrate prepared by coating both surfaces of base paper having a grammage of 130 g/m$^2$ with LDPE (low-density polyethylene) to prepare an RC paper, conducting corona discharge on one surface of the RC paper to impart a hydrophilic property, and forming a heat-insulating layer having the following composition (solid) by application so that the dry applied amount was 15 g/m$^2$.

| | |
|---|---|
| Ropaque Ultra E (hollow particles) produced by Rohm and Haas Company | 100 parts |
| PVA117 (binder resin) produced by Kuraray Co., Ltd. | 20 parts |
| Glyoxal (cross-linking agent) | 3 parts |

The thermal transfer-receiving sheets of Examples and Comparative Examples prepared as such were evaluated in terms of the following.

<Detachability>

In a 35° C. 50% RH environment, 10 copies of a solid black chart were continuously printed using each of the thermal transfer-receiving sheets of Examples and Comparative Examples, a sublimation thermal transfer printer (UP-DR200) produced by Sony Corporation, and a Sony-brand thermal transfer recording ribbon (2UPC-R204) for this printer (printing size: 4×6), and detachability was evaluated from the copies. The reason for conducting evaluation in a 35° C. environment is that the detachment failures tend to occur frequently in a high temperature environment since the thermal transfer recording sheets and the thermal transfer recording ribbon are not sufficiently cooled when they are being detached. In other words, evaluation was conducted in a more hostile environment for detachment. The condition for starting printing was made the same by adjusting the temperature inside the printer at the start of the printing to 35° C.

⊚: Good detachability was exhibited and all 10 copies were free of any problem in terms of quality. No sound associated with detachment occurred.

○: Some sound associated with detachment occurred but all 10 copies were free of any problems in terms of quality.

Δ: Loud sound associated with detachment occurred and detachment lines were confirmed on copies made in the latter half of printing.

X: Significantly loud sound associated with detachment occurred and detachment lines were confirmed in all of the copies.

<Color Density>

A solid black chart was printed on each of the thermal transfer-receiving sheets of Examples and Comparative Examples in a normal temperature, normal humidity environment by using the sublimation thermal transfer printer and the thermal transfer recording ribbon described above. The reflection density of the solid black portion was measured with Macbeth TR924. In this test also, the temperature in the printer at the start of printing was adjusted to 25° C. to avoid influences of the stored heat on the color density. The color density is preferably 1.90 or more.

<Lightfastness>

A gray patch having a color density in the range of 1.0±0.1 was printed on each of the thermal transfer-receiving sheets of Examples and Comparative Examples in a normal temperature, normal humidity environment by using the sublimation thermal transfer printer and the thermal transfer recording ribbon described above. The resulting prints were subjected to a lightfastness test under following conditions. The conditions of the lightfastness test were light-source: xenon, filter: 370 nm UV-cut filter, illuminance: 60,000 lux, temperature and humidity in a container: 22° C. and 55% RH, BP temperature: 40° C., and exposure time: 120 hours. In this test, XL75 produced by Suga Test Instruments Co., Ltd., was used. The difference in color between before and after exposure was measured under the following conditions. The measurement conditions were light-source: D65, viewing angle: 2°, filter: ASNI A. In this test, Spectrolino produced by GretagMacbeth was used. The lightfastness is preferably 3.5 or less.

<Image Bleeding Resistance>

A lattice pattern constituted by solid black fine lines was printed on each of the thermal transfer-receiving sheets of Examples and Comparative Examples in a normal temperature, normal humidity environment by using the sublimation thermal transfer printer and the thermal transfer recording ribbon described above. The resulting prints were stored for 1 month in a 35° C. 95% RH environment and taken out. The bleeding of the fine lines of the lattice pattern was visually investigated and evaluated.

⊚: Bleeding did not occur and the fine lines of the lattice pattern remained as clear as they were initially.

○: Substantially no bleeding occurred and fine lines of the lattice pattern were clear.

Δ: Bleeding occurred and the fine lines of the lattice pattern were collapsed and blurred.

x: Severe bleeding occurred and the fine lines of the lattice pattern were hardly recognizable.

The evaluation results are shown in Table 3.

TABLE 3

| Examples and Comparative Examples | | Resin composition | Detachability | Color density | Lightfastness ΔE* | Image bleeding |
|---|---|---|---|---|---|---|
| Examples | 1 | A | ○ | 1.91 | 3.5 | ○ |
|  | 2 | B | ○ | 1.93 | 3.1 | ○ |
|  | 3 | C | ○ | 1.94 | 2.8 | ○ |
|  | 4 | D | ○ | 1.91 | 2.9 | ⊚ |
|  | 5 | E | ○ | 1.94 | 3.3 | ⊚ |
|  | 6 | F | ○ | 1.96 | 3.9 | ⊚ |
|  | 7 | G | ○ | 1.95 | 2.0 | ○ |
|  | 8 | H | ⊚ | 1.95 | 1.9 | ⊚ |
|  | 9 | I | ⊚ | 1.93 | 1.9 | ○ |
|  | 10 | J | ⊚ | 1.92 | 2.0 | ⊚ |
|  | 11 | K | ○ | 2.04 | 1.7 | ○ |
|  | 12 | L | ○ | 2.03 | 1.7 | ⊚ |
|  | 13 | M | ⊚ | 2.04 | 1.6 | ○ |
|  | 14 | N | ⊚ | 2.03 | 1.7 | ⊚ |
|  | 15 | O | ⊚ | 2.05 | 1.5 | ⊚ |
|  | 16 | P | ⊚ | 2.12 | 1.2 | ○ |
|  | 17 | Q | ⊚ | 2.10 | 1.5 | ⊚ |
| Comparative Examples | 1 | R | Δ | 1.77 | 3.8 | Δ |
|  | 2 | S | Δ | 1.80 | 6.6 | Δ |
|  | 3 | T | Δ | 1.79 | 5.8 | Δ |
|  | 4 | U | X | 1.85 | 3.6 | X |
|  | 5 | V | — | — | 9.1 | X |

Table 3 shows that according to the resin composition of embodiments of the present invention and the thermal transfer-receiving sheets of Examples 1 to 17 having a dye-receiving layer formed applying the resin composition on a substrate, detachability during printing can be improved, the color density can be increased, the lightfastness can be enhanced, and the image bleeding can be suppressed. In particular, since particular polyols were used in the shells of the latexes of embodiments of the present invention in Examples 7 to 10 and Examples 13 to 17, detachability and lightfastness were further improved. The printer used in the evaluation can produce 4×6-size full color prints continuously in about 8 seconds and can be considered as a recent high-speed sublimation thermal transfer printer. The thermal transfer-receiving sheets of Examples 1 to 17 achieved good detachability even when solid black images were continuously printed by applying a maximum energy in the high-temperature environment described above with such a high-speed printer.

Moreover, in Examples 11 to 17, the color density and the lightfastness were improved further since the core of the latex is copolymerized with a hydroxy alkyl (meth)acrylate. In Examples 4 to 6, 8, 10, 12, 14, 15, and 17, image bleeding was further suppressed since cross-linking agents composed of an aziridine-containing compound, an oxazoline-containing compound, or a carbodiimide-containing compound were used.

In contrast, in Comparative Example 1, the color density was significantly lower and the detachability and image bleeding resistance were also poor since the shell was composed of an acrylic resin instead of the urethane resin. In Comparative Examples 2 and 3, evaluation was lower for all items since the core was not composed of the acrylic resin. Comparative Example 4 was poor particularly in terms of detachability and image bleeding resistance since no cross-linking agent was used. Comparative Example 5 had severe image bleeding since the core was not composed of the acrylic resin and no cross-linking agent was used. In Comparative Example 5, the evaluation results of the detachability and the color density are not shown. This is because evaluation was not possible since the thermal transfer recording sheet and the thermal transfer recording ribbon became fused.

In view of the above, the thermal transfer-receiving sheet displays good detachability during printing since the dye-receiving layer is composed of a resin composition that contains a particular core/shell-type latex and a cross-linking agent that reacts with carboxyl groups contained in the shell as in Examples 1 to 17. The thermal transfer-receiving sheet has high color density, good lightfastness, and suppressed image bleeding and can form high-grade images comparable to silver halide photographs.

The present application contains subject matter related to that disclosed in Japanese Priority Patent Application JP 2009-189587 filed in the Japan Patent Office on Aug. 18, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A resin composition used to form a dye-receiving layer of a thermal transfer-receiving sheet in which the dye-receiving layer is formed on at least one surface of a substrate, the resin composition comprising:

a core/shell-type latex including a core containing an acrylic resin, the acrylic resin at least comprising as one of its monomers a substituted or unsubstituted phenoxyalkyl (meth)acrylate and/or a substituted or unsubstituted phenoxy polyalkylene glycol (meth)acrylate and a shell containing a urethane resin containing a carboxyl group; and a cross-linking agent that reacts with a carboxyl group contained in the shell, wherein, the mass ratio of the core to shell is from 8:2 to 4:6, inclusive.

2. The resin composition according to claim 1, wherein the urethane resin is composed of an aliphatic polyester polyol and/or an aliphatic polycarbonate diol, a carboxyl-containing aliphatic polyol, and an isocyanate compound.

3. The resin composition according to claim 1, wherein the acrylic resin contains a hydroxyalkyl (meth)acrylate as a comonomer.

4. The resin composition according to claim 1, wherein the cross-linking agent is at least one compound selected from an aziridine-containing compound, an oxazoline-containing compound, and a carbodiimide-containing compound.

* * * * *